United States Patent
Guven et al.

(10) Patent No.: US 10,947,819 B2
(45) Date of Patent: Mar. 16, 2021

(54) ACTIVE ALTERNATOR CONTROL IN A DOWNHOLE TOOL STRING

(71) Applicant: Schlumberger Technology Corporation, Sugar Land, TX (US)

(72) Inventors: Mustafa Kamil Guven, Katy, TX (US); Torgeir Rusten, Cheltenham (GB); In Chul Jang, Sugar Land, TX (US); Yaoxin Qian, Missouri City, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 112 days.

(21) Appl. No.: 15/828,516

(22) Filed: Dec. 1, 2017

(65) Prior Publication Data
US 2018/0163514 A1 Jun. 14, 2018

Related U.S. Application Data

(60) Provisional application No. 62/431,527, filed on Dec. 8, 2016.

(51) Int. Cl.
| | |
|---|---|
| *E21B 41/00* | (2006.01) |
| *E21B 4/20* | (2006.01) |
| *E21B 44/00* | (2006.01) |
| *E21B 7/06* | (2006.01) |
| *H02K 7/06* | (2006.01) |
| *E21B 21/12* | (2006.01) |

(Continued)

(52) U.S. Cl.
CPC ............ *E21B 41/0085* (2013.01); *E21B 4/02* (2013.01); *E21B 4/20* (2013.01); *E21B 7/068* (2013.01); *E21B 21/12* (2013.01); *E21B 44/005* (2013.01); *H02K 7/18* (2013.01); *H02K 7/1823* (2013.01); *F03B 13/02* (2013.01); *H02P 9/04* (2013.01)

(58) Field of Classification Search
CPC .......... E21B 41/00; E21B 41/085; E21B 4/02; E21B 21/12; E21B 4/20; E21B 7/068; H02K 7/18; H02K 7/1823; H02P 9/04
See application file for complete search history.

(56) References Cited

U.S. PATENT DOCUMENTS

| | | | |
|---|---|---|---|
| 6,092,610 A | 7/2000 | Kosmala et al. | |
| 6,857,486 B2 * | 2/2005 | Chitwood | E21B 4/04 175/104 |

(Continued)

*Primary Examiner* — David J Bagnell
*Assistant Examiner* — Manuel C Portocarrero
(74) *Attorney, Agent, or Firm* — Eileen Pape

(57) ABSTRACT

A downhole system includes a drill string having a drilling fluid flow channel and at least one turbine alternator deployed in the flow channel. The turbine alternator is configured to convert flowing drilling fluid to electrical power. A voltage bus is configured to receive electrical power from the turbine alternator and at least one electrical motor is configured to receive electrical power from the voltage bus. An electronic controller is configured to provide active control of the turbine alternator via processing a desired speed of the electrical motor to generate a desired torque current and feeding the desired torque current forward to the turbine alternator. The turbine alternator is responsive to the desired torque current such that it modifies the electrical power provided to the voltage bus in response to the desired torque.

16 Claims, 10 Drawing Sheets

(51) Int. Cl.
*E21B 4/02* (2006.01)
*F03B 13/02* (2006.01)
*H02P 9/04* (2006.01)
*H02K 7/18* (2006.01)

(56) References Cited

U.S. PATENT DOCUMENTS

| | | | | |
|---|---|---|---|---|
| 2008/0156486 A1* | 7/2008 | Ciglenec | ............. | E21B 49/10 |
| | | | | 166/250.15 |
| 2009/0058675 A1* | 3/2009 | Sugiura | ............. | E21B 17/028 |
| | | | | 340/854.8 |
| 2010/0025116 A1* | 2/2010 | Hutton | ............. | E21B 7/06 |
| | | | | 175/61 |
| 2016/0348478 A1* | 12/2016 | Goodman | ............. | E21B 41/0085 |

\* cited by examiner

US 10,947,819 B2

ACTIVE ALTERNATOR CONTROL IN A DOWNHOLE TOOL STRING

CROSS-REFERENCES TO RELATED APPLICATIONS

This application claims priority to U.S. Provisional Patent Application No. 62/431,527, filed on Dec. 8, 2016, which is incorporated in its entirety by reference herein.

BACKGROUND

Downhole turbine alternators convert mechanical power from flowing drilling fluid in a drill string to electrical power for downhole use. Such turbine alternators are commonly utilized in downhole drilling operations to provide electrical power for various downhole tools including electrical motors and other electrical power consuming devices. For example, rotary steerable drilling tools, which are commonly utilized in downhole drilling operations, may include multiple electrical motors, solenoids, and electronic circuit boards that require a significant quantity of electrical power. Rotary steerable drilling tools may also commonly include or are connected to a turbine alternator that is intended to supply the necessary electrical power.

Downhole turbine alternators commonly employ passive rectification such that the voltage supplied by the alternator (e.g., to a voltage bus) is directly proportional to the flow rate of the drilling fluid in the drill string. The bus voltage is also generally dependent on the power load, and generally decreases with increasing power draw. Limited voltage regulation can be provided by devices such as field windings via controlling flux levels in the alternator.

SUMMARY

In some embodiments, a downhole system includes a drill string having a drilling fluid flow channel and at least one turbine alternator deployed in the flow channel. The turbine alternator is configured to convert flowing drilling fluid to electrical power. A voltage bus is configured to receive electrical power from the turbine alternator and at least one electrical motor is configured to receive electrical power from the voltage bus. An electronic controller is configured to provide active control of the turbine alternator via processing a desired speed of the electrical motor to generate a desired torque current and feeding the desired torque current forward to the turbine alternator. The turbine alternator is responsive to the desired torque current such that it modifies the electrical power provided to the voltage bus in response to the desired torque.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

For a more complete understanding of the disclosed subject matter, and advantages thereof, reference is now made to the following descriptions taken in conjunction with the accompanying drawings, in which.

DETAILED DESCRIPTION

Some embodiments of the present application relate generally to downhole power control mechanisms and more particularly to downhole drilling systems employing active alternator control employing a feed forward command torque current and controlled power dissipation mechanisms. In some embodiments, such downhole power systems provide a stable bus voltage substantially independent of drilling fluid flow rate and electrical power consumption. For example, certain of the disclosed embodiments may provide a downhole system having active alternator control. The system may advantageously provide a substantially constant voltage at a voltage bus independent of the drilling fluid flow rate and the power draw of various power consuming components (e.g., electric motors) in the system.

Figure 1:
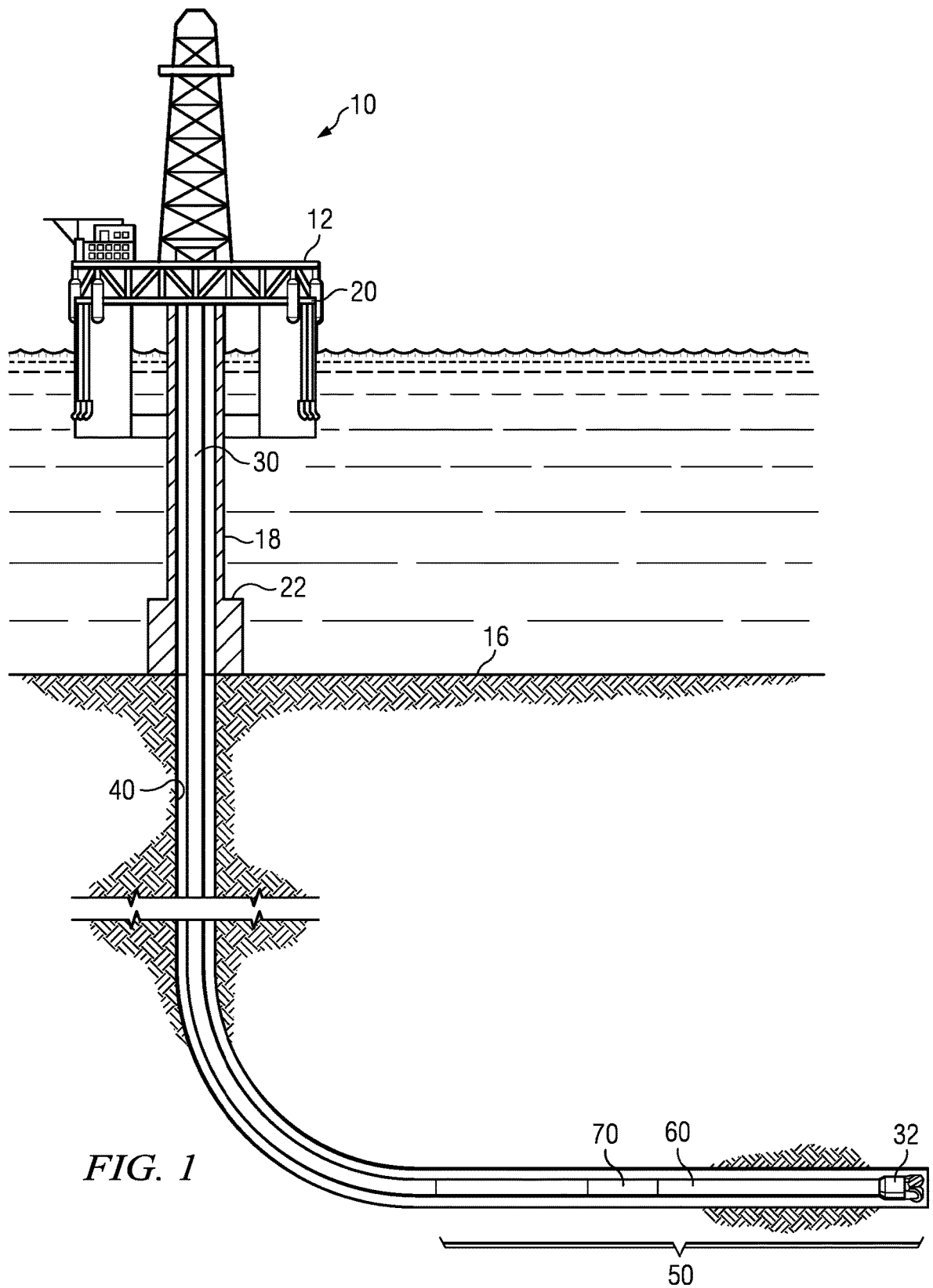
FIG. 1 depicts an example drilling rig on which disclosed embodiments may be utilized.

FIG. 1 depicts a drilling rig 10 suitable for using various method and system embodiments disclosed herein. A semi-submersible drilling platform 12 is positioned over an oil or gas formation (not shown) disposed below the sea floor 16. A subsea conduit 18 extends from deck 20 of platform 12 to a wellhead installation 22. The platform may include a derrick and a hoisting apparatus (not shown) for raising and lowering a drill string 30, which, as shown, extends into borehole 40 and includes a bottom hole assembly (BHA) 50. In the depicted embodiment, the BHA 50 includes a drill bit 32, a downhole turbine alternator 70, and an electrical power consuming downhole tool 60 such as a rotary steerable tool (also sometimes referred to in the art as a directional drilling tool).

While the turbine alternator 70 is shown as being distinct from the power consuming tool 60, the disclosed embodiments are not limited in this regard as the turbine alternator may be deployed in the power consuming tool 60 (e.g., in a rotary steerable tool). The disclosed embodiments are further not limited in regards to the relative deployment of the alternator 70 and the tool 60. The turbine alternator 70 may be deployed above, below, or within the downhole tool 60 in the BHA 50.

Those of ordinary skill in the art will readily appreciate that, while not depicted, the BHA 50 may further optionally include substantially any other suitable downhole tools such as a downhole drilling motor, a downhole telemetry system, measurement while drilling tools, logging while drilling tools, and the like. Such other tools may also consume electrical power and therefore may be in electrical communication with the downhole turbine alternator 70. The disclosed embodiments are not limited in regards to such other tools.

As stated above, the downhole tool 60 may include a rotary steerable tool, for example, a rotary steerable tool employing at least one electrical motor for controlling various electrically actuatable components (such as blades) that are used to steer the drill bit. In such an embodiment the rotary steerable tool (along with other optional power consuming tools) may be deployed in electrical communication with and be configured to receive electrical power from the turbine alternator 70.

Various rotary steerable tool configurations are known in the art including various steering mechanisms for controlling the direction of drilling. For example, the PathMaker rotary steerable system (available from PathFinder a Schlumberger Company), the AutoTrak rotary steerable system (available from Baker Hughes), and the GeoPilot rotary steerable system (available from Haliburton) include a substantially non-rotating outer housing employing blades that engage the borehole wall. Engagement of the blades with the borehole wall is intended to eccenter the tool body, thereby pointing or pushing the drill bit in a desired direction while drilling. A rotating shaft deployed in the outer housing transfers rotary power and axial weight-on-bit to the drill bit during drilling. Accelerometer and magnetometer sets may be deployed in the outer housing and therefore are non-rotating or rotate slowly with respect to the borehole wall.

The PowerDrive rotary steerable systems (available from Schlumberger) fully rotate with the drill string (i.e., the outer housing rotates with the drill string). The PowerDrive Xceed rotary steerable system makes use of an internal steering mechanism that does not require the use of extended pads or ribs to contact with the borehole wall and enables the tool body to fully rotate with the drill string. The PowerDrive X5, X6, and Orbit rotary steerable systems make use of mud actuated blades (or pads) that contact the borehole wall. The extension of the blades (or pads) is rapidly and continually adjusted as the system rotates in the borehole. The PowerDrive Archer makes use of a lower steering section joined at an articulated swivel with an upper section. The swivel is actively tilted via pistons so as to change the angle of the lower section with respect to the upper section and maintain a desired drilling direction as the bottom hole assembly rotates in the borehole. Accelerometer and magnetometer sets may rotate with the drill string or may be deployed in an internal roll-stabilized housing such that they remain substantially stationary (in a bias phase) or rotate slowly with respect to the borehole (in a neutral phase). To drill a desired curvature, the bias phase and neutral phase are alternated during drilling at a predetermined ratio (referred to as the steering ratio). Again, the disclosed embodiments are not limited to use with any particular steering tool configuration.

While various embodiments may be described herein with respect to rotary steerable drilling tools (e.g., when the power consuming tool 60 is a rotary steerable tool), it will be understood that the disclosed embodiments are not so limited. Rather, the disclosed embodiments include a system and/or a method for providing electrical power to substantially any suitable electrically powered downhole tools. Electrical motors (also referred to in the electrical arts as electrical machines) are widely used in downhole operations, for example, in the aforementioned rotary steerable tools, in mud pulse telemetry systems, in formation sampling tools, in logging while drilling tools such as formation pressure while drilling tools, in downhole pumps, and may even be used to power the drill bit.

Disclosed system embodiments include a downhole turbine alternator in electrical communication with an electrical motor (e.g., in one of the aforementioned downhole tools). Some embodiments further employ active alternator control employing a feed forward term (e.g., a feed forward torque) that provides for a stable voltage at a downhole bus. As is described in more detail below, the bus voltage is intended to be substantially independent of the drilling fluid flow rate and the power consumption of the electric motor(s) and other power consuming devices in the string.

Figure 2:
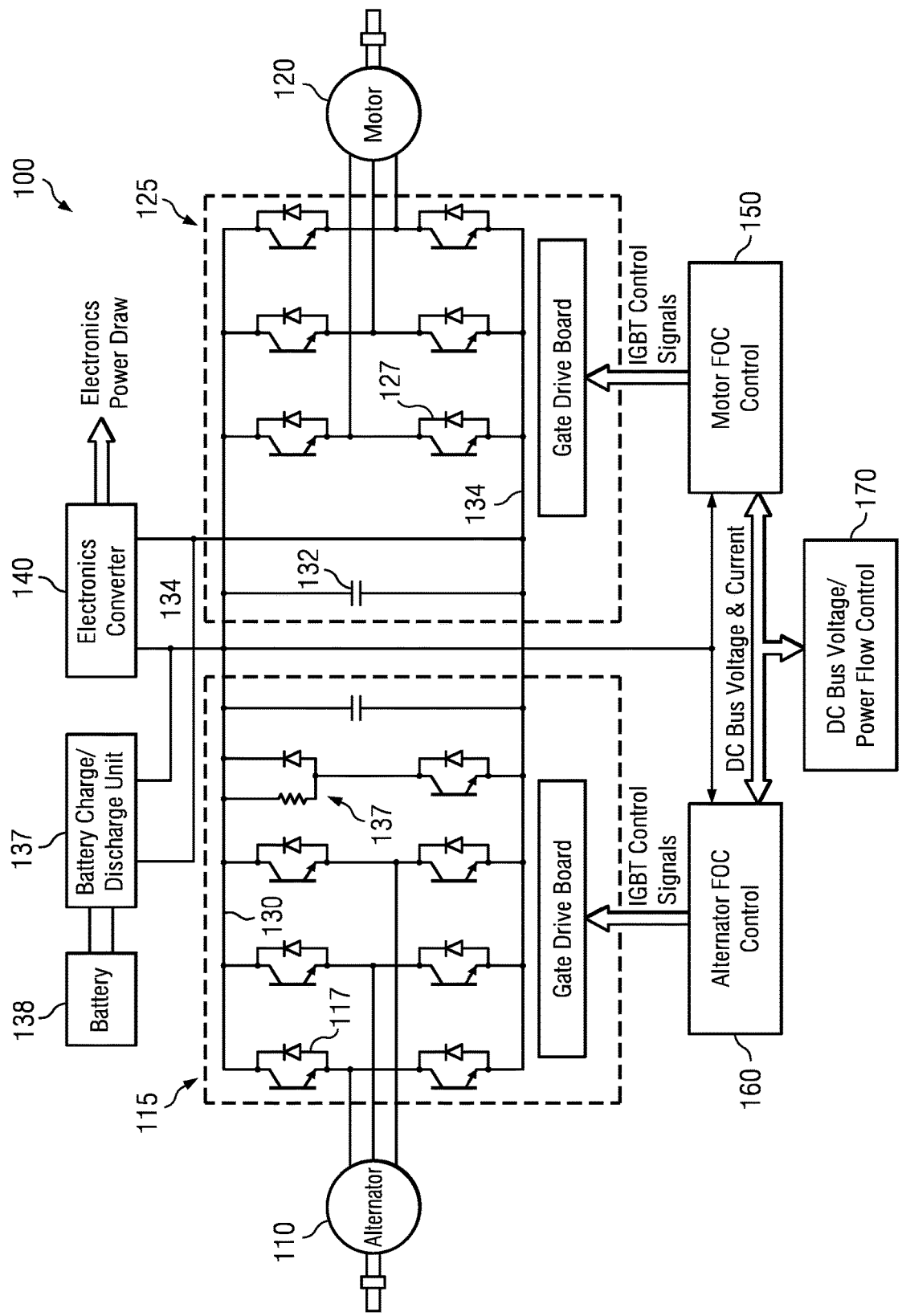
FIG. 2 depicts a block diagram of one example control system.

FIG. 2 depicts a block diagram of one disclosed system 100 including a downhole turbine alternator 110 in electrical communication with a downhole electrical motor 120. In the depicted embodiment, the alternator 110 is connected with an inverter 115 including an array of diodes 117. The inverter 115 is configured to convert AC power from the alternator 110 to a DC voltage on voltage bus 130. The electrical motor 120 is likewise connected with an inverter 125 including a corresponding array of diodes 127. Inverter 125 is configured to convert DC power from the voltage bus 130 to AC power that drives the motor 120. It will, of course, be understood that the inverters are also configured for reverse operation such that the inverter 115 may convert DC bus voltage to AC power that drives the alternator and inverter 125 may convert AC power from the motor to a DC voltage on bus 130.

In the depicted embodiment, the control system may further include one or more capacitors 132 deployed between the voltage bus 130 and electrical ground 134. The capacitors may be configured to provide a buffer current to prevent rapid voltage drawdown on bus 130 upon activation of the motor 120. The depicted embodiment may further include an optional chopper 137 for dissipating excess power, for example, as generated when braking the motor 120.

With continued reference to FIG. 2, an electronics converter 140 is in electrical communication with the voltage bus 130 and is configured to provide electrical power to various electronic components in the downhole tool (e.g., within the control architecture). In the depicted embodiment the control system further includes a battery charge/discharge unit 137 and a battery 138, both of which are in electrical communication with the voltage bus 130 and the electronics converter 140. The battery 138 may be configured to provide the electrical power necessary to power the electronics. The battery charge/discharge unit 137 may be configured to charge the battery 138 when sufficient voltage is available on the voltage bus.

In the depicted embodiment, system 100 further includes a motor controller 150 and an alternator controller 160. The motor controller 150 is configured to control/manage the operation of the motor, for example, to implement a received torque command or to implement steering commands in a rotary steerable tool, while the alternator controller 160 is configured to control/manage the operation of the turbine alternator 110. The motor controller 150 and alternator controller 160 may be electrically coupled to the motor and alternator via a gate drive board (e.g., using conventional insulated gate bipolar transistor control signals). A DC bus voltage controller 170 is configured to regulate the voltage on the bus 130 via providing a feed forward torque current as described in more detail with respect to FIG. 3.

It will be understood that the alternator 110 may include substantially any suitable turbine alternator configured for use in downhole drilling operations, for example, as disclosed in commonly assigned U.S. Pat. No. 6,092,610. In common downhole turbine alternator systems, the turbine may include a rotor that is mounted to rotate with respect to a stator such that the flow of drilling fluid in the drill string rotates the rotor. The rotor may include a shaft that drives an alternator, for example, via a transmission mechanism. The alternator converts the rotational energy of the rotor (and shaft) to alternating current (AC) electrical power as is known to those of ordinary skill in the art. As depicted on FIGS. 2 and 3, the alternator 110 may thus provide electrical power to the motor 120.

Figure 3:
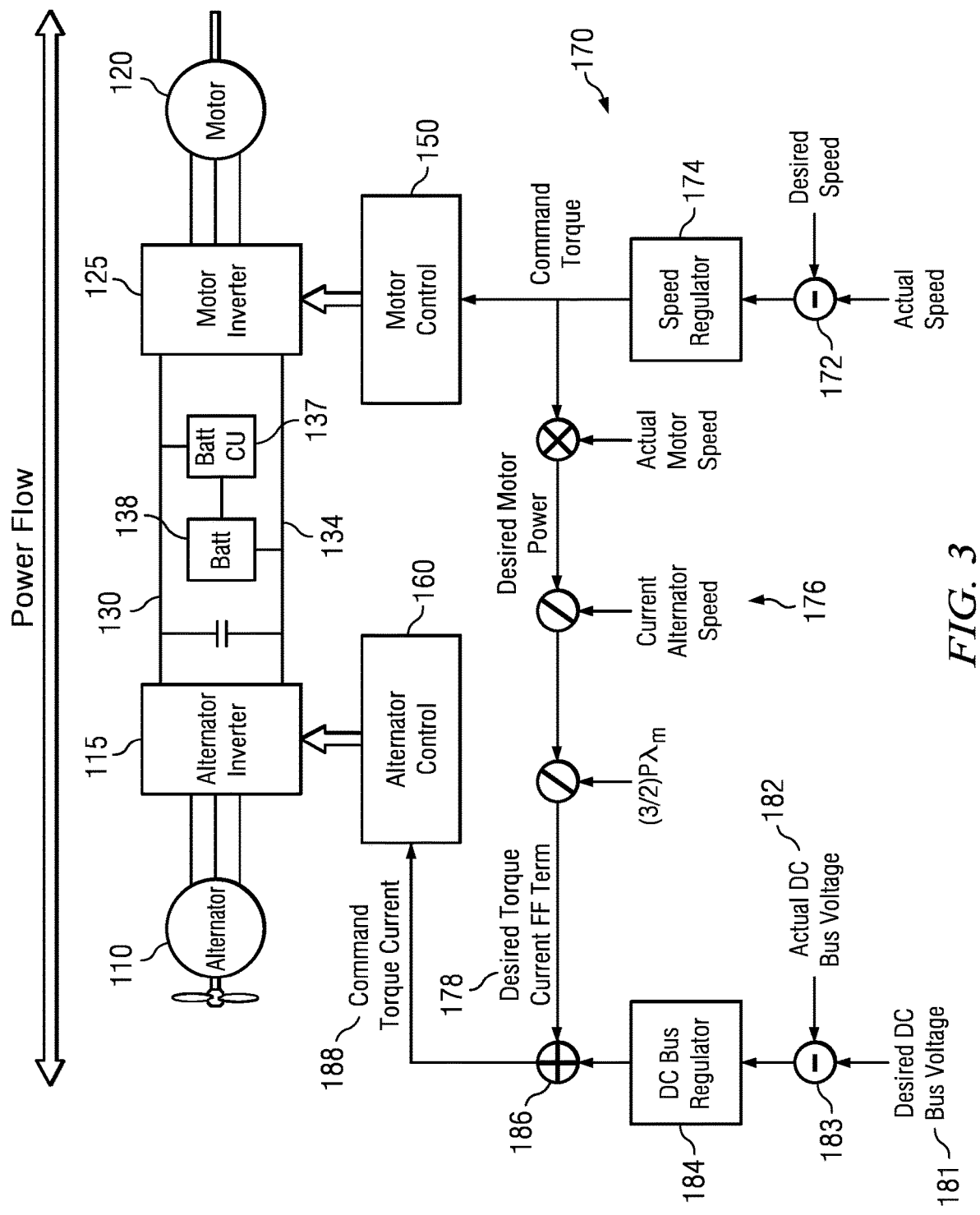
FIG. 3 depicts a block diagram of one example control algorithm suitable for use with the control system shown on FIG. 2.

FIG. 3 depicts a block diagram of one example control algorithm suitable for use with the control system 100 shown on FIG. 2. As described above DC bus voltage controller 170 may be configured to provide a feed forward torque control parameter to the alternator controller 160. For example, upon receiving a command to change the motor speed (or in a continuous loop), a difference 172 between the desired motor speed and the actual motor speed may be computed and processed via a speed regulator 174 to obtain a command torque. The command torque may be applied to the motor 120 via motor controller 150. The command torque may be further processed at 176, for example, via multiplying by the actual motor speed, dividing by the present alternator speed, and dividing by a product of the permanent magnet flux ($\lambda_m$) and number of pole pairs (P) in the alternator to compute a feed forward desired torque current term at 178. It will be understood that in embodiments in which the alternator includes an induction generator that commanded flux can be used instead of commanded torque.

With continued reference to FIG. 3, a difference 183 between a desired DC bus voltage 181 and the actual (or measured) DC bus voltage 182 is computed and processed via a DC bus regulator 184 to obtain a command current. The command current is summed at 186 with the feed forward desired torque current term to obtain a command torque current 188 which is applied to the alternator 110 via alternator controller 160.

Figure 4:
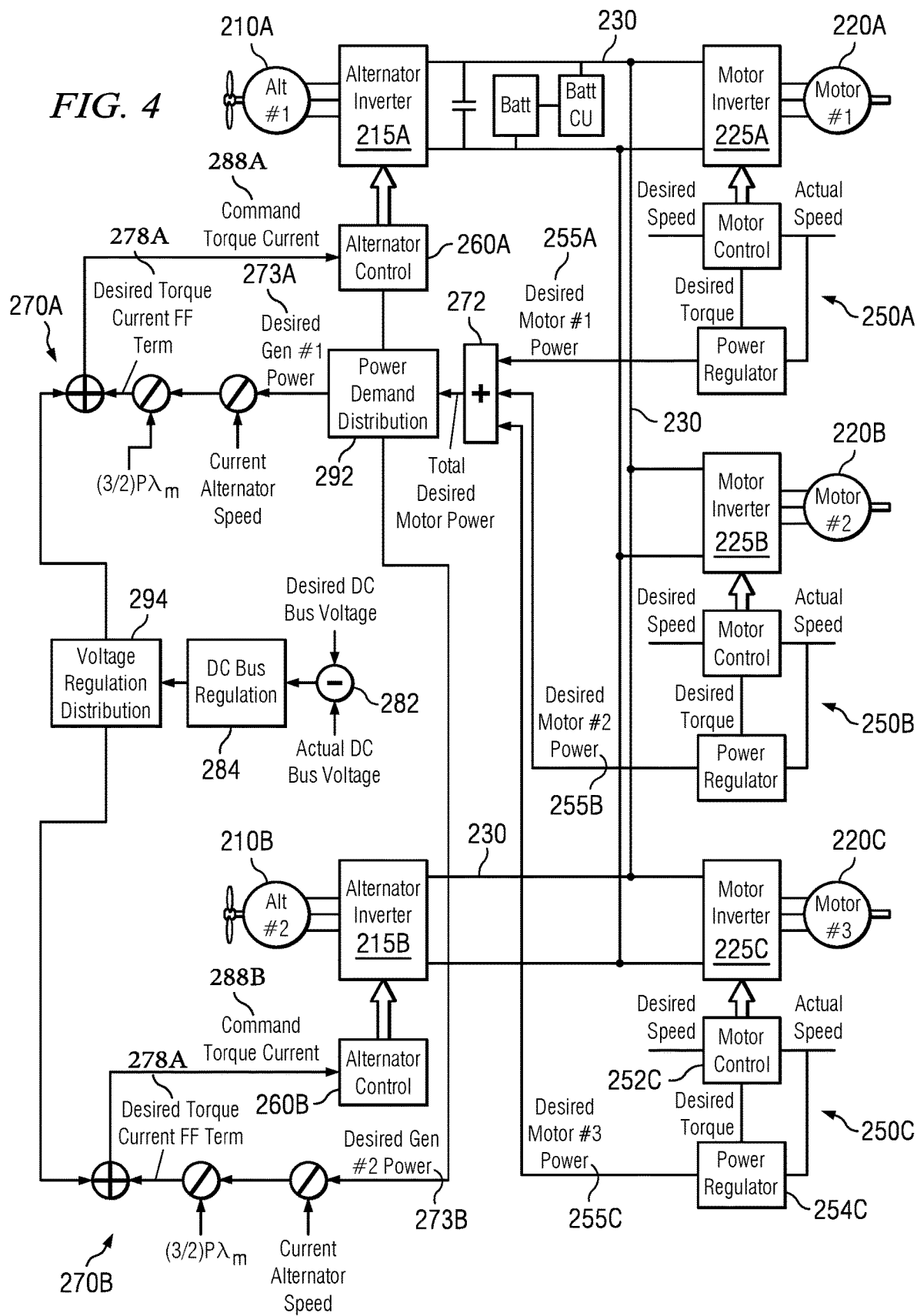
FIG. 4 depicts a block diagram of a system including multiple motors and multiple alternators.

FIG. 4 depicts a block diagram of a system 200. System 200 is similar to system 100 with the primary exception being that system 200 includes a plurality of power generators (e.g., a plurality of alternators) and a plurality of power drains (e.g., a plurality of electric motors). In the depicted embodiment, system 200 includes first and second alternators 210A and 210B, each having a corresponding inverter 215A and 215B. The system further includes first, second, and third electric motors 220A, 220B, and 220C, each having a corresponding motor inverter 225A, 225B, and 225C. As depicted, the alternators 210A and 210B and the electric motors 220A, 220B, and 220C are in electrical communication with a common voltage bus 230. While the depicted system includes two alternators and three motors, it will be understood that the disclosed embodiments may include substantially any suitable number of alternators and motors, for example, including a single alternator and multiple motors, multiple alternators and a single motor, or multiple alternators and multiple motors in any suitable combination (e.g., two alternators and three motors as depicted).

With continued reference to FIG. 4, each motor 220A, 220B, and 220C includes corresponding control architecture 250A, 250B, and 250C configured to generate a corresponding desired motor power based on a desired speed and the actual speed of the motor 220A, 220B, and 220C. For example, with respect to motor 220C, a desired speed and the actual motor speed are processed by a motor controller 252C to generate a desired torque which is in turn processed by a power regulator 254C to generate the desired motor power 255C. The desired motor powers 255A, 255B, and 255C generated by controllers 250A, 250B, and 250C may be summed at 272 to obtain a total desired motor power.

Figure 5A:
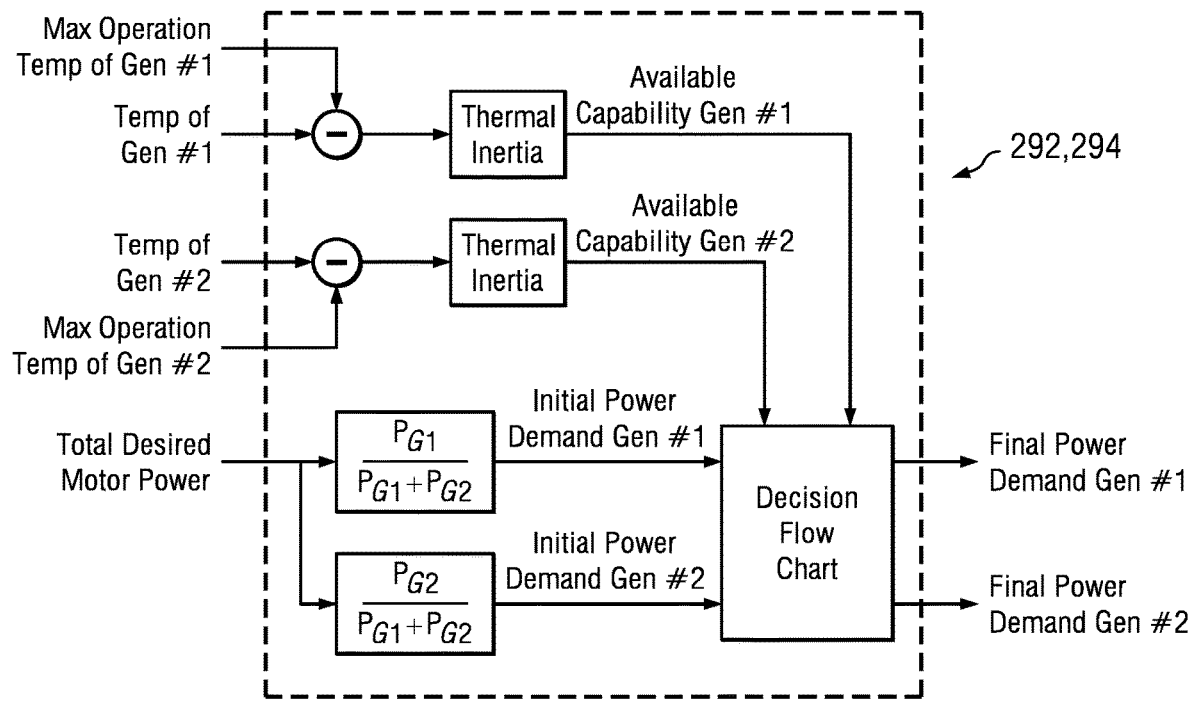
FIGS. 5A and 5B depict example power demand distribution and voltage regulation distribution modules.
Figure 5B:
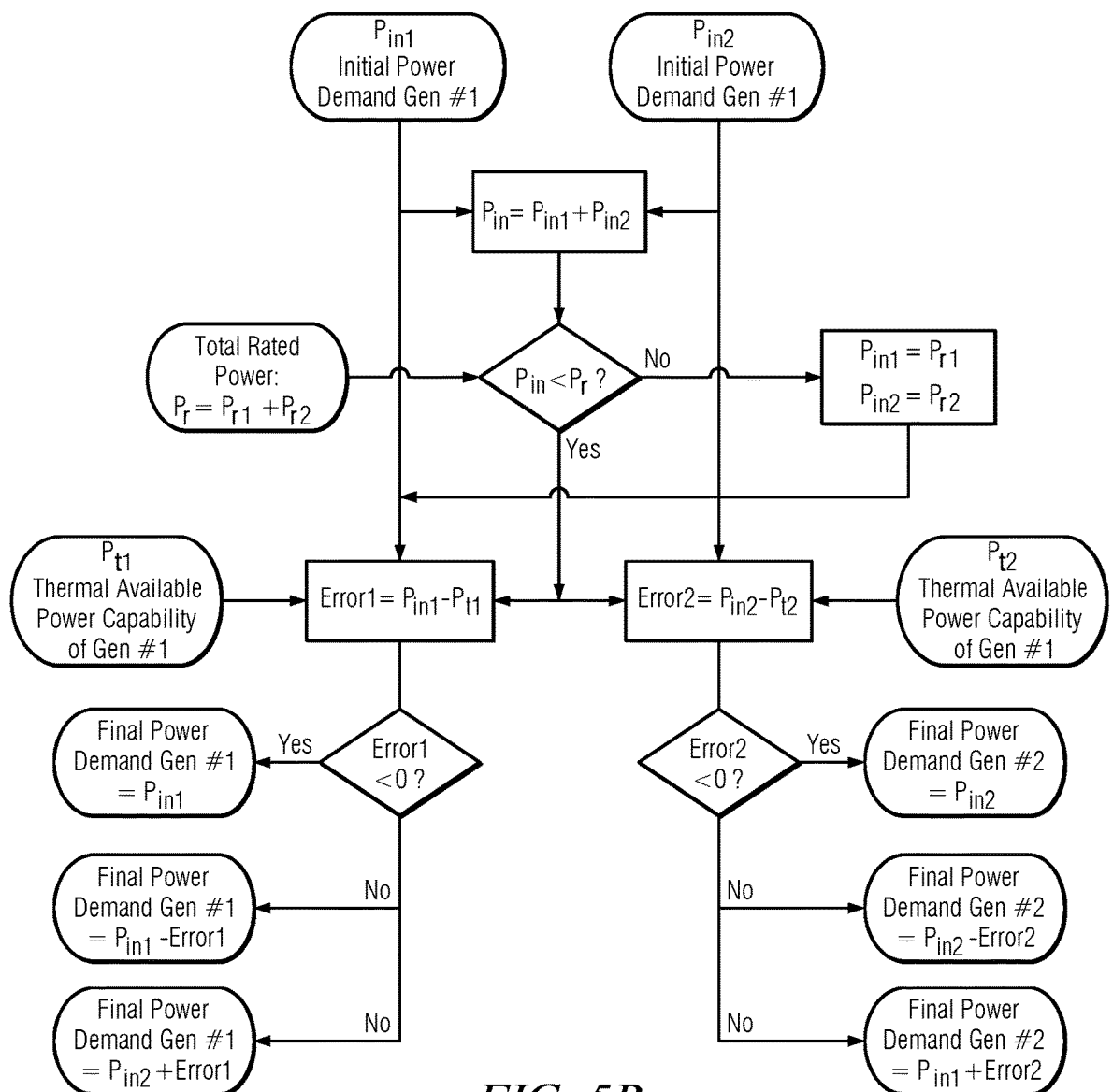

A power demand distribution module 292 and a voltage regulation distribution module 294 determine (in combination) the power distribution to the alternators 210A and 210B. For example, modules 292 and 294 may be configured to process the temperature, thermal inertia, and a rated capacity of each alternator to determine the power distribution. In one embodiment, the modules 292 and 294 may be configured using similar (or identical) logic. One example embodiment of module 292 and 294 is depicted on FIG. 5A (with a decision flow chart depicted on FIG. 5B). As described above, the modules 292 and 294 may process the temperature of each alternator, the maximum operating temperatures, and the rated capacity of the alternators $P_G$ to determine desired power demands for each alternator (as depicted).

With continued reference to FIG. 4, each alternator 210A and 210B includes a corresponding control architecture 270A and 270B configured to generate a corresponding feed forward desired torque current 278A and 278B based on the desired power demands 273A and 273B obtained from power demand distribution module 292. A difference 282 between a desired DC bus voltage and the actual DC bus voltage is computed and processed via a DC bus regulator 284 and the voltage regulation distribution module 294 to obtain demand currents for each alternator. These command currents are summed at 286A and 286B with each of the feedforward desired torque currents 278A and 278B to obtain the corresponding command torque currents 288A and 288B which are applied to the alternators 210A and 210B via corresponding alternator controllers 260A and 260B.

Figure 6A:
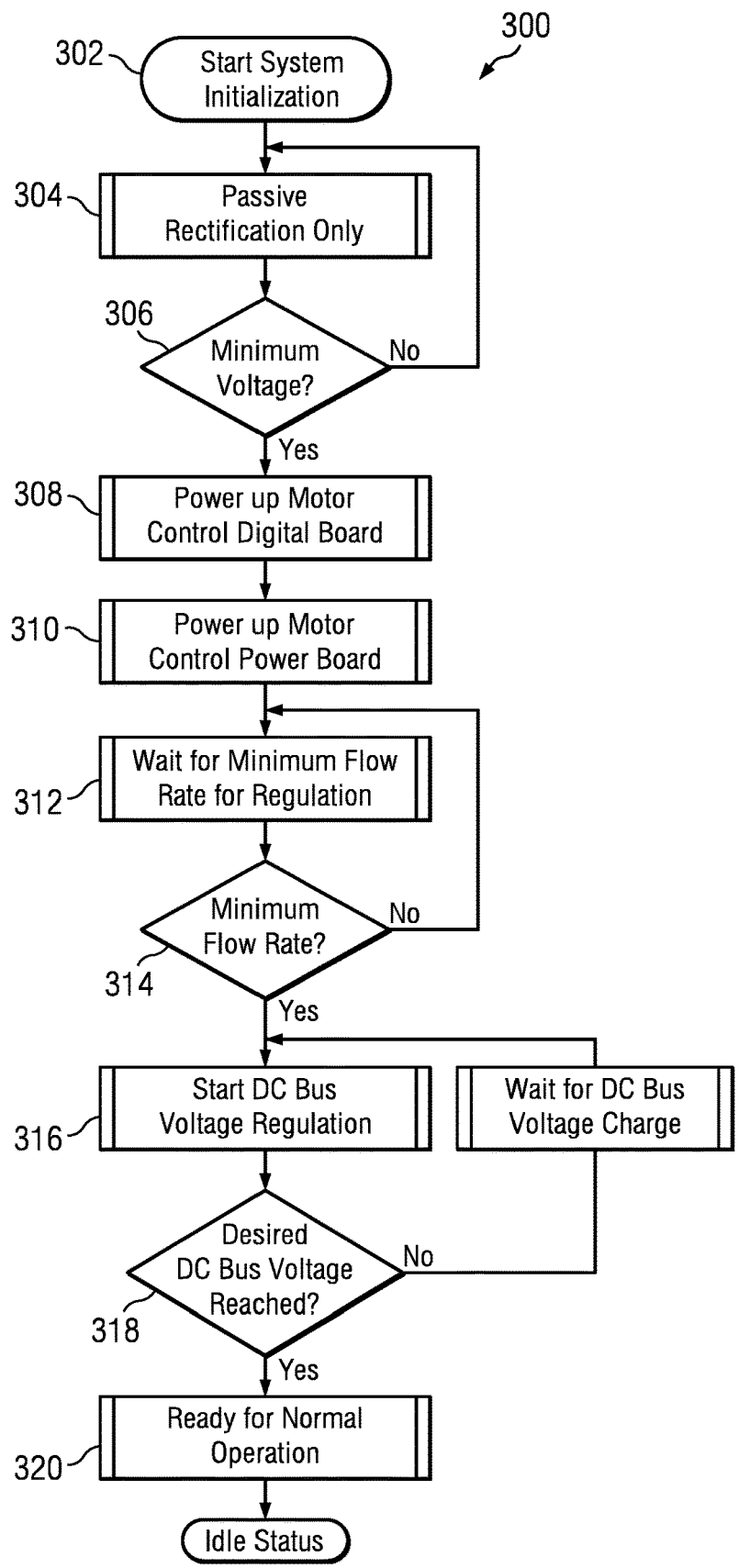
FIGS. 6A and 6B depict flow charts of example start-up sequences for the system depicted on FIGS. 2 and 3.

FIG. 6A depicts a flow chart of an example start-up sequence 300 without a battery. The system is initialized at 302 with passive rectification at 304 (e.g., only at 304). When a minimum voltage is present 306, the motor controller is powered up (with the digital and power boards being powered at 308 and 310). The system then waits for a minimum flow rate of drilling fluid at 312. When the minimum flow rate is detected at 314, voltage bus regulation may then be initiated at 316. The voltage at the bus may then be monitored at 318 until a desired minimum voltage level is reached at which point the system is ready for normal operation at 320.

Figure 6B:
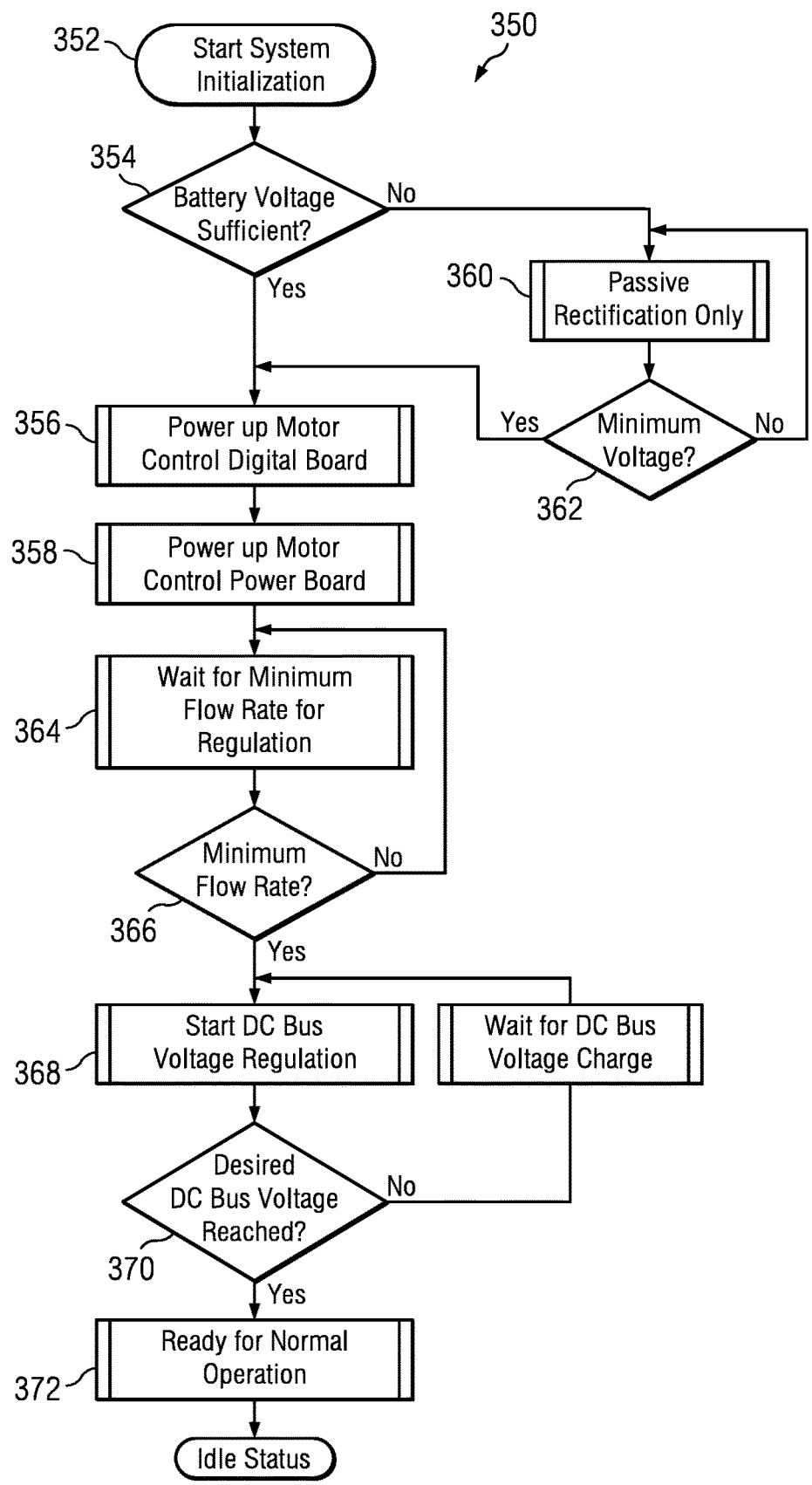

FIG. 6B depicts a flow chart of an example start-up sequence 350 with a battery (e.g., as depicted on FIGS. 2-4). The system is initialized at 352. If the battery voltage is sufficient at 354 (i.e., exceeds a minimum threshold), then the motor controller may be powered up at 356 and 358. When the battery voltage is insufficient at 354, the system is initialized with passive rectification at 360 (e.g., only at 360) and waits for a minimum voltage at 362 prior to powering up the motor controller at 356 and 358. The system then waits for a minimum flow rate of drilling fluid at 364. When the minimum flow rate is detected at 366, voltage bus regulation may then be initiated at 368. The voltage at the bus may then be monitored at 370 until a desired minimum voltage level is reached at which point the system is ready for normal operation at 372.

Figure 7:
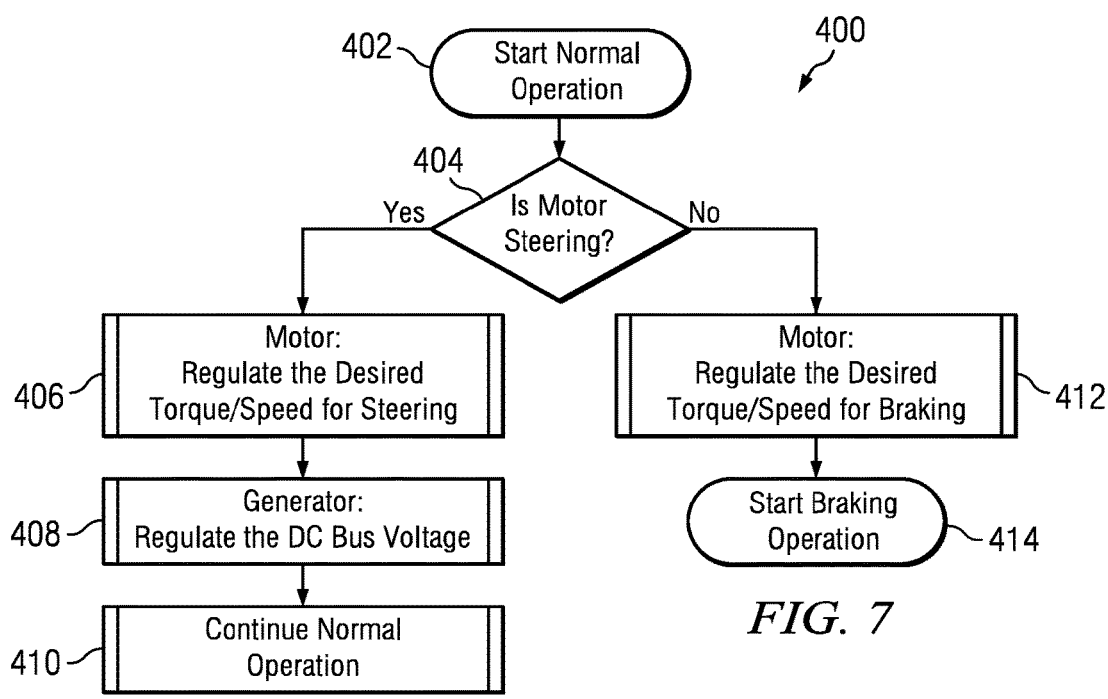
FIG. 7 depicts a flow chart of an example operation consuming alternator power for the system depicted on FIGS. 2 and 3.

FIG. 7 depicts a flow chart of an example operation 400 in which a motor (or motors or other devices) consume(s) electrical power for the systems depicted on FIGS. 2-4. Normal operation is started at 402 (e.g., via start-up sequence 300 or 350). When the motor is running (e.g., steering) at 404 (e.g., via a steering operation), the speed and torque of the motor is regulated at 406 (e.g., as described above with respect to FIG. 3 at 172, 174, 176, and 178). The alternator may also be regulated at 408 to regulate the voltage at the bus (e.g., as described above with respect to FIG. 3 at 182, 184, 186, and 188). Normal operation continues at 410 until otherwise interrupted at 404. When the motor is no longer running (e.g., no longer steering) the speed and torque of the motor may be regulated for braking at 412 and the braking action initiated at 414.

Figure 8:
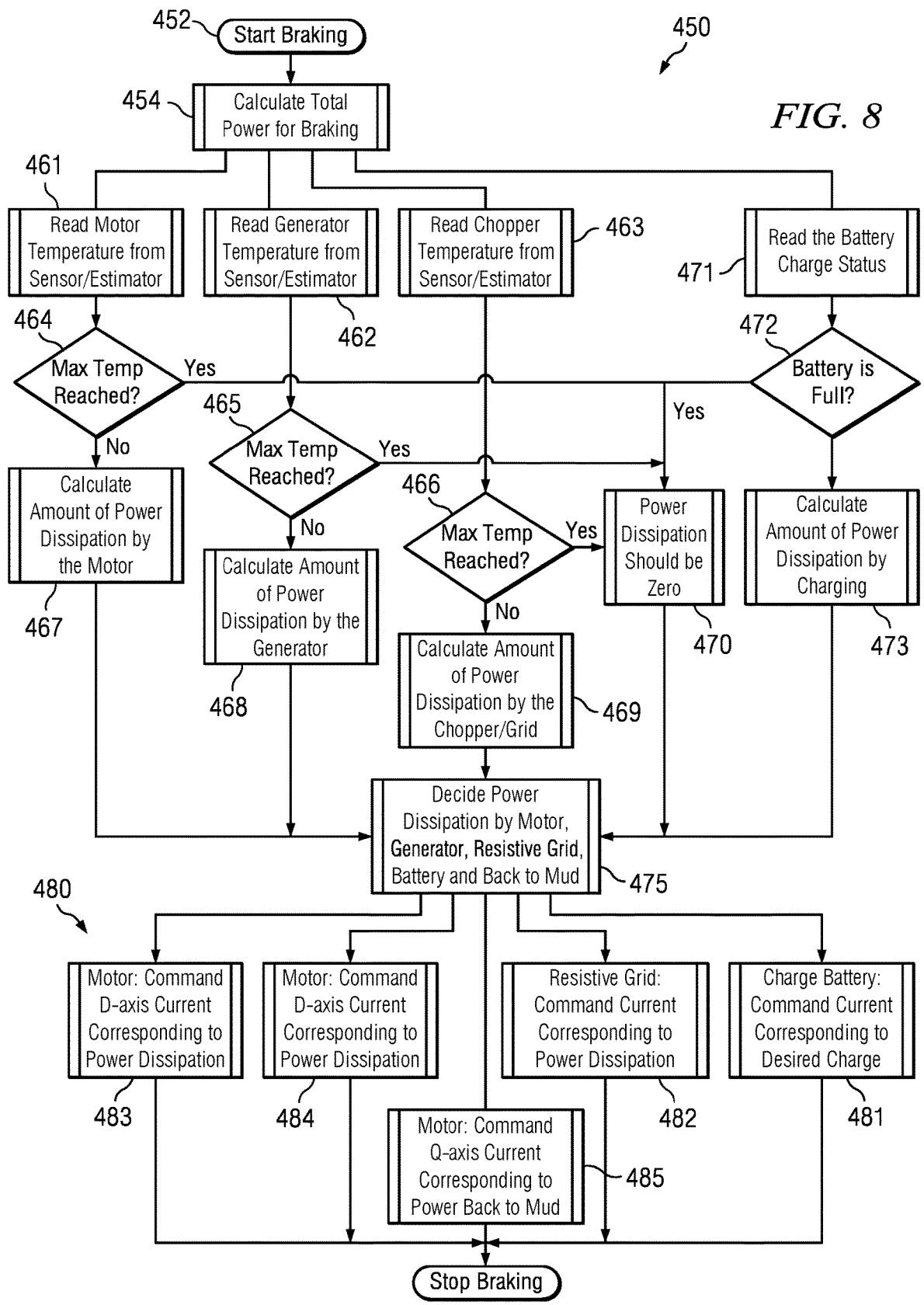
FIG. 8 depicts a flow chart of an example braking operation including motor power dissipation for the system depicted on FIGS. 2 and 3.

FIG. 8 depicts a flow chart of an example braking operation 450 including dissipation of electrical motor power upon braking for the systems depicted on FIGS. 2-4. The braking operation is initiated at 452 and the total power dissipation required for fully braking the motor is computed at 454. For example, the total power to be dissipated may be computed by the change (decrease) in motor speed in which the power equals the torque times the change in speed. The power may be dissipated via various mechanisms, for example, via the motor, the alternator, a chopper (including a resistor), and/or via battery charging. In the depicted embodiment, each of these power dissipation mechanisms is evaluated at 460. At 461, 462, and 463 the motor, alternator, and chopper temperatures are received (or measured). If these temperatures are less than corresponding predetermined thresholds at 464, 465, and 466 then the measured temperatures may be processed to compute (or look up) the amount of electrical power that may be dissipated through the motor 467, the alternator 468, and/or the chopper 469. Those of ordinary skill in the art will appreciate that the quantity of power that may be dissipated through the motor or alternator tends to be approximately proportional to the difference between the maximum and actual temperatures (with the proportionality being related to a known thermal inertia of the device). Computed power values as a function of temperature may be stored in a look-up table or computed downhole. If any of these temperatures are greater than or equal to the corresponding thresholds then the amount of power dissipation via the corresponding mechanism (motor, alternator, or chopper) is zero at 470.

At 471 the battery charge may also be received and evaluated at 472 to determine the amount of electrical power that may be dissipated via charging the battery 473. The power dissipation mechanisms to be utilized may then be decided at 475 (based on the availability of each mechanism and other predetermined criteria). In one example embodiment, the mechanism(s) selected for dissipating excess motor power may be prioritized at 475 in the following order: (i) charge the battery(ies), (ii) dissipate excess torque via accelerating the rotor, (iii) pass current through a resistive element in the chopper, and (iv) dissipate excess flux via the alternator and/or electric motor.

With continued reference to FIG. 8, excess power may be dissipated at 480 based on the prioritization established at 475. Motor braking power may be used to charge one or more batteries at 481 or may be dissipate via a resistive grid (e.g., in a chopper) at 482. Direct-axis current (i.e., flux) may be dissipated via the electric motor at 483 or the alternator at 484. Quadrature-axis current (i.e., torque) may be dissipated via accelerating the rotor (such that power is transferred to the drilling fluid) at 485.

The following example is intended to further illustrate the disclosed embodiments and certain potential advantages thereof, but, of course, should not be construed as in any way limiting scope. The system depicted on FIG. 3 was evaluated in a laboratory setting. A DC motor was used to simulate the flow rate of the drilling fluid by rotating the rotor shaft of the alternator at predetermined rotation rates (in an analogous manner to changing the flow rate of drilling fluid that rotates a turbine impeller).

Figure 9A:
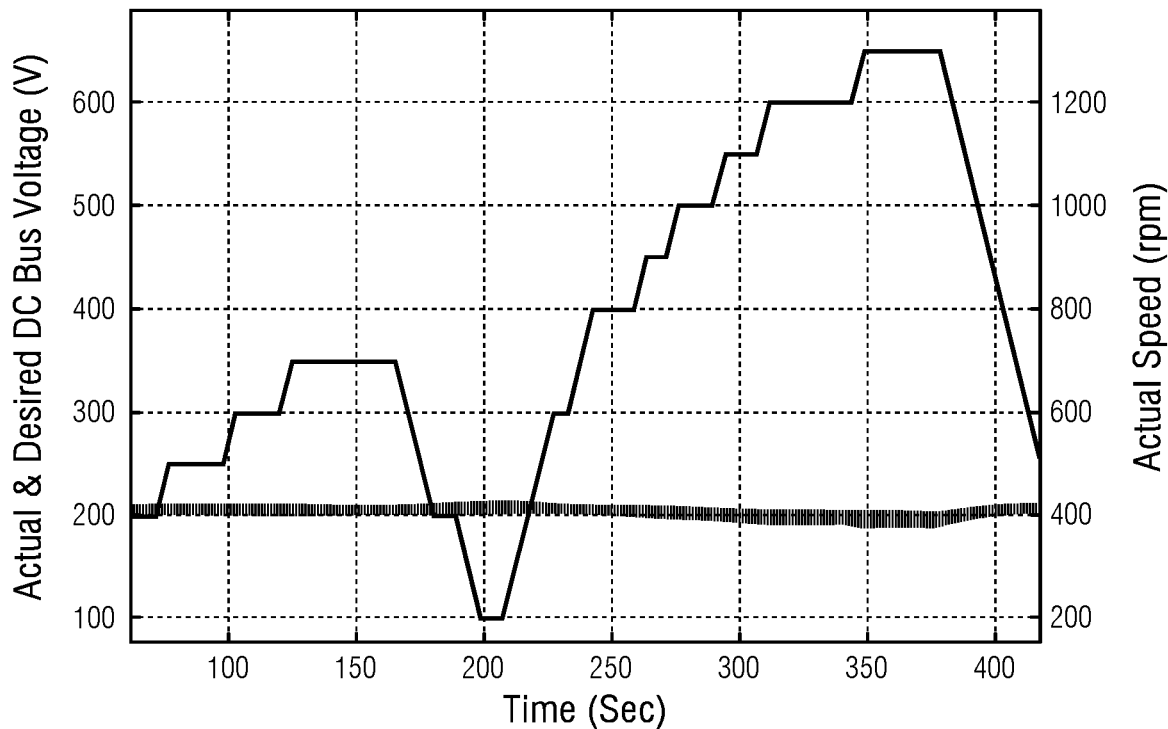
FIGS. 9A and 9B depict plots of actual and desired bus voltages on the left vertical axis and the rotation rate of the rotor on the right vertical axis versus time on the horizontal axis.

FIG. 9A depicts a plot of the actual and desired bus voltages on the left vertical axis and the rotation rate of the rotor on the right vertical axis versus time on the horizontal axis. The desired bus voltages were varied stepwise (in 50 and 100 volt steps) over a range from about 100 to about 700 volts (by varying the desired voltage at 181 in FIG. 3). The actual bus voltages were observed to match (within a tight tolerance) the desired voltages over the entire range with essentially no change in the rotation rate of the rotor (which remained essentially constant at about 400 rpm).

Figure 9B:
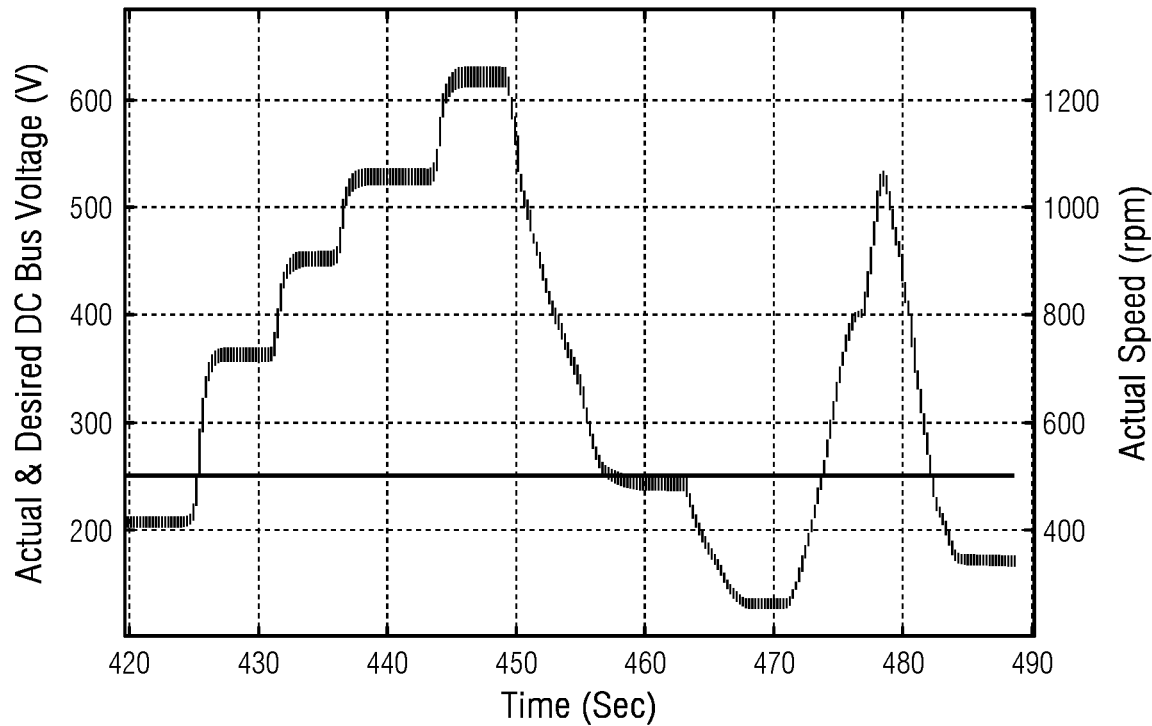

FIG. 9B depicts another plot of the actual and desired bus voltages on the left vertical axis and the rotation rate of the rotor on the right vertical axis versus time on the horizontal axis. The desired bus voltage was set to 250 volts (at 181 in FIG. 3). The rotation rate of the rotor was then varied both stepwise and monotonically (both upwards and downwards) over a range of rotation rates varying from about 50 to about 625 rpm. The actual bus voltage was observed to remain substantially constant (within a tight tolerance) at the desired value of 250 volts independent of the rotation rate of the rotor.

It will be appreciated that the system and method embodiments disclosed herein may be configured for downhole implementation via various hardware controllers (e.g., deployed in a rotary steerable drilling tool or elsewhere in the drill string). A suitable controller may include, for example, a programmable processor, such as a microprocessor or a microcontroller and processor-readable or computer-readable program code embodying logic. A suitable processor may be utilized, for example, to execute all or part of the methodology depicted in FIGS. 3-8 (or various steps in these methodologies). A suitable controller may also optionally include other controllable components, such as sensors (e.g., temperature sensors), data storage devices, power supplies, timers, and the like. The controller may also be disposed to be in electronic communication with various sensors. Suitable controllers may also optionally communicate with other instruments in the drill string, such as, for example, telemetry systems that communicate with the surface. Suitable controllers may further optionally include volatile or non-volatile memory or a data storage device.

Although systems and methods for providing active alternator control in a downhole tool string tool has been described in detail, it should be understood that various changes, substitutions and alternations can be made herein without departing from the spirit and scope of the disclosure as defined by the appended claims.

The invention claimed is:

1. A downhole system comprising:
 a drill string including a drilling fluid flow channel;
 at least one turbine alternator deployed in the flow channel and configured to convert flowing drilling fluid to electrical power;
 a voltage bus configured to receive electrical power from the at least one turbine alternator;
 at least one electrical motor configured to receive electrical power from the voltage bus;
 a battery in electrical communication with the voltage bus;
 a plurality of power dissipation channels including at least a battery charging channel and a resistive grid channel, the plurality of power dissipation channels configured to receive electrical motor power; and an electronic controller configured to provide active control of the at least one turbine alternator, the electronic controller configured to: (i) process a desired speed of the at least one electrical motor to generate a desired torque current, and (ii) feed the desired torque current forward to the at least one turbine alternator, the at least one turbine alternator responsive to the desired torque current such that it modifies the electrical power provided to the voltage bus in response to the desired torque current.

2. The system of claim 1, wherein the electronic controller is further configured to: (iii) generate a demand current by processing a difference between an actual voltage and a desired voltage on the voltage bus, and (iv) combine the demand current and the desired torque current to obtain a command torque current, the at least one turbine alternator being responsive to the command torque current such that a DC voltage at the voltage bus is substantially independent of a flow rate of drilling fluid in the flow channel.

3. The system of claim 1, wherein the at least one electrical motor is deployed in a rotary steerable drilling tool.

4. The system of claim 1, further comprising at least one capacitor deployed between the voltage bus and electrical ground.

5. The system of claim 1, further comprising a chopper deployed between the voltage bus and electrical ground, the chopper configured to dissipate excess electrical power on the voltage bus to ground.

6. The system of claim 1, comprising a plurality of electrical motors configured to receive electrical power from the voltage bus, wherein the electronic controller is configured to: (i-a) process a desired speed of each of the plurality of electrical motors to generate corresponding desired motor powers, (i-b) sum the desired motor powers to generate a total desired motor power, (i-c) process the total desired motor power to generate the desired torque current, and (ii) feed the desired torque current forward to the at least one turbine alternator.

7. The system of claim 1, comprising a plurality of turbine alternators deployed in the flow channel, wherein the electronic controller is configured to: (i-a) process a desired speed of the at least one electrical motor to generate a desired motor power, (i-b) distribute the desired motor power to the plurality of turbine alternators, (i-c) process said distributed desired motor power to obtain corresponding distributed desired torque currents, (ii) feed the distributed desired torque currents forward to the plurality of turbine alternators, (iii) generate a demand current by processing a difference between an actual voltage and a desired voltage on the voltage bus, (iv) distribute the demand current to the plurality of turbine alternators, and (v) combine said distributed demand currents and the distributed desired torque currents to obtain a corresponding plurality of command torque currents, the plurality of turbine alternators being responsive to the plurality of command torque currents such that a DC voltage at the voltage bus is substantially independent of a flow rate of drilling fluid in the flow channel.

8. The system of claim 1, comprising a plurality of turbine alternators deployed in the flow channel and a plurality of electrical motors configured to receive electrical power from the voltage bus, wherein the electronic controller is configured to: (i-a) process a desired speed of each of the plurality of electrical motors to generate corresponding desired motor powers, (i-b) sum the desired motor powers to generate a total desired motor power, (i-c) distribute the total desired motor power to the plurality of turbine alternators, (i-d) process said distributed total desired motor power to obtain corresponding distributed desired torque currents, (ii) feed the desired torque current forward to the at least one turbine alternator, (iii) generate a demand current by processing a difference between an actual voltage and a desired voltage on the voltage bus, (iv) distribute the demand current to the plurality of turbine alternators, and (v) combine said distributed demand currents and the distributed desired torque currents to obtain a corresponding plurality of command torque currents, the plurality of turbine alternators being responsive to the plurality of command torque currents such that a DC voltage at the voltage bus is substantially independent of a flow rate of drilling fluid in the flow channel.

9. The system of claim 1, wherein the electronic controller is further configured to (iii) compute a total braking power generated by decelerating the at least one electrical motor, (iv) evaluate an availability of a selected plurality of power dissipation channels, and (v) distribute the braking power to at least one of the selected plurality of power dissipation channels based on the evaluation in (iv).

10. The system of claim 1, further including:
a first inverter configured to convert AC electrical power from the at least one turbine alternator to DC power for the voltage bus; and
a second inverter configured to convert DC electrical power on the voltage bus to AC electrical power for the at least one electrical motor.

11. A method for dissipating excess power generated by decelerating an electrical motor in a downhole system, the method comprising:
(a) deploying the downhole system in a subterranean wellbore, the system including (i) at least one turbine alternator deployed in a flow channel of a drill string, the at least one turbine alternator configured to convert flowing drilling fluid to electrical power, (ii) a voltage bus configured to receive the electrical power from the at least one turbine alternator, (iii) at least one electrical motor configured to receive electrical power from the voltage bus, and (iv) a battery in electrical communication with the voltage bus;
(b) computing a total braking power generated by decelerating the at least one electrical motor,
(c) evaluating an availability of a selected plurality of power dissipation channels comprising a battery charging channel, a resistive grid channel, a drilling fluid channel, an electric motor channel, and a turbine alternator channel; and
(d) distributing the braking power to at least one of the selected plurality of power dissipation channels based on the evaluation in (c).

12. The method of claim 11, wherein (c) further comprises:
computing an available dissipation power for each of the selected plurality of power dissipation channels; and
(ii) prioritizing the selected plurality of power dissipation channels based on the total braking power and the available dissipation power for each of the power dissipation channels.

13. The method of claim 11, wherein evaluating the availability of the resistive grid channel, the electric motor channel, and the turbine alternator channel comprises: (i) receiving a measured temperature, (ii) comparing the measured temperature with a maximum temperature, and (iii) processing a difference between the measured temperature and the maximum temperature to obtain an available dissipation power for the corresponding channel.

14. A method for dissipating excess power generated by decelerating an electrical motor in a downhole system, the method comprising:
  (a) deploying the downhole system in a subterranean wellbore, the system including (i) at least one turbine alternator deployed in a flow channel of a drill string, the at least one turbine alternator configured to convert flowing drilling fluid to electrical power, (ii) a voltage bus configured to receive the electrical power from the at least one turbine alternator, and (iii) at least one electrical motor configured to receive electrical power from the voltage bus;
  (b) computing a total braking power generated by decelerating the at least one electrical motor,
  (c) evaluating an availability of a selected plurality of power dissipation channels; and
  (d) distributing the braking power to at least one of the selected plurality of power dissipation channels based on the evaluation in (c);
  wherein the selected plurality of power dissipation channels comprises a battery charging channel, a resistive grid channel, a drilling fluid channel, an electric motor channel, and a turbine alternator channel.

15. The method of claim 14, wherein (c) further comprises:
  computing an available dissipation power for each of the selected plurality of power dissipation channels; and
  (ii) prioritizing the selected plurality of power dissipation channels based on the total braking power and the available dissipation power for each of the power dissipation channels.

16. The method of claim 14, wherein evaluating the availability of the resistive grid channel, the electric motor channel, and the turbine alternator channel comprises: (i) receiving a measured temperature, (ii) comparing the measured temperature with a maximum temperature, and (iii) processing a difference between the measured temperature and the maximum temperature to obtain an available dissipation power for the corresponding channel.

* * * * *